(12) United States Patent
Craggs et al.

(10) Patent No.: US 11,169,904 B2
(45) Date of Patent: Nov. 9, 2021

(54) AUTOMATICALLY INITIATING TRACING OF PROGRAM CODE BASED ON STATISTICAL ANALYSIS

(71) Applicant: INTERNATIONAL BUSINESS MACHINES CORPORATION, Armonk, NY (US)

(72) Inventors: Daniel Craggs, Verdun (CA); Ian G. Craggs, Salisbury (GB); Jeremiah S. Swan, Stouffville (CA)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 139 days.

(21) Appl. No.: 16/205,831

(22) Filed: Nov. 30, 2018

(65) Prior Publication Data

US 2020/0174909 A1  Jun. 4, 2020

(51) Int. Cl.
*G06F 11/36* (2006.01)
*G06F 9/445* (2018.01)

(52) U.S. Cl.
CPC ...... *G06F 11/3636* (2013.01); *G06F 9/44526* (2013.01)

(58) Field of Classification Search
CPC .................. G06F 11/3636; G06F 9/44526
See application file for complete search history.

(56) References Cited

U.S. PATENT DOCUMENTS

| 6,182,243 | B1 | 1/2001 | Berthe et al. |
| 7,493,598 | B1 | 2/2009 | Craggs |
| 8,108,839 | B2 | 1/2012 | Clark |
| 8,140,911 | B2 | 3/2012 | Borghetti et al. |
| 8,832,504 | B2 | 9/2014 | Shazly |
| 8,972,791 | B2 | 3/2015 | Han |
| 2008/0126828 | A1 | 5/2008 | Girouard et al. |
| 2008/0155339 | A1* | 6/2008 | Lowe .................. G06F 11/3636 714/38.13 |
| 2011/0022551 | A1* | 1/2011 | Dixon .................. G06F 11/3616 706/12 |
| 2011/0067008 | A1* | 3/2011 | Srivastava .......... G06F 11/3636 717/128 |
| 2012/0060142 | A1* | 3/2012 | Fliess .................. G06F 11/3428 717/102 |

(Continued)

OTHER PUBLICATIONS

Mell, Peter and Tim Grance, "The NIST Definition of Cloud Computing," National Institute of Standards and Technology, Information Technology Laboratory, Special Publication 800-145, Sep. 2011, pp. 1-7.

(Continued)

*Primary Examiner* — Bryce P Bonzo
*Assistant Examiner* — Michael Xu
(74) *Attorney, Agent, or Firm* — Edward Wixted, Esq.; Blanche E. Schiller, Esq.; Heslin Rothenberg Farley & Mesiti P.C.

(57) ABSTRACT

A trace risk indicator is determined based on statistical analysis of one or more risk factors associated with a portion of code of a computer program being executed. The one or more risk factors include data of at least one source external to the portion of code. Based on the trace risk indicator having a predetermined relationship with respect to a threshold value, tracing is automatically initiated for the portion of code.

20 Claims, 7 Drawing Sheets

(56) References Cited

U.S. PATENT DOCUMENTS

| | | | | |
|---|---|---|---|---|
| 2014/0237454 A1* | 8/2014 | Delporte | ............ | G06F 11/0721 |
| | | | | 717/128 |
| 2014/0317454 A1* | 10/2014 | Gataullin | ............ | G06F 11/3003 |
| | | | | 714/45 |
| 2016/0124724 A1* | 5/2016 | Gautam | ............ | G06F 11/3616 |
| | | | | 717/143 |
| 2017/0048109 A1* | 2/2017 | Kant | ............ | H04L 41/147 |
| 2017/0091071 A1* | 3/2017 | Chitale | ............ | G06F 11/008 |
| 2018/0060216 A1* | 3/2018 | Kasi | ............ | G06F 11/3688 |
| 2018/0357079 A1* | 12/2018 | Demulder | ............ | G06F 9/541 |
| 2019/0102244 A1* | 4/2019 | Tarlano | ............ | G06N 5/022 |
| 2019/0332519 A1* | 10/2019 | Myers | ............ | G06F 11/3093 |

OTHER PUBLICATIONS

IBM, "z/ Architecture—Principles of Operation," IBM Publication No. SA22-7832-11, Twelfth Edition, Sep. 2017, pp. 1-1902.
Berndl, M. et al., "Dynamic Profiling and Trace Cache Generation" International Symposium on Code Generation and Optimization, Mar. 2003, pp. 276-285 (Abstract Only).

* cited by examiner

THE ONE OR MORE RISK FACTORS INCLUDE A PERFORMANCE COST OF TRACING ~314

THE ONE OR MORE RISK FACTORS INCLUDE A COUNT OF LINES OF AT LEAST THE PORTION OF CODE EXECUTED DURING TESTING ~316

THE ONE OR MORE RISK FACTORS INCLUDE HISTORICAL DATA STORED AS METADATA OF A PLUGIN OF THE COMPUTING ENVIRONMENT ~318

THE TRACE RISK INDICATOR INCLUDES A RISK POINTS VALUE ~320

THE DETERMINING THE RISK POINTS VALUE INCLUDES USING AN EQUATION: ~322
(POINTS ASSIGNED TO RECENTLY CHANGED CODE PLUS POINTS ASSIGNED TO CODE EXCEPTIONS PLUS POINTS ASSIGNED TO NUMBER OF DEFECTS) MULTIPLIED BY A PERFORMANCE COST OF TRACING

THE PREDETERMINED RELATIONSHIP INCLUDES EXCEEDS ~326

THE TRACING IS AUTOMATICALLY INITIATED BASED ON THE RISK POINTS VALUE EXCEEDING THE THRESHOLD VALUE ~328

FIG. 3B

AUTOMATICALLY INITIATING TRACING OF PROGRAM CODE BASED ON STATISTICAL ANALYSIS

BACKGROUND

One or more aspects relate, in general, to processing within a computing environment, and in particular, to facilitating tracing of computer programs executing within the computing environment.

Tracing is used to provide data regarding execution of computer program code. As an example, tracing is turned on manually, after a defective condition within a computer program has occurred. In these instances, tracing is not available for the first occurrence of the defective condition. Thus, time and effort are spent attempting to recreate the defect in order to acquire the trace. However, this may not be possible, or it may be very time consuming. Often, it is difficult to recreate a defect, especially when it occurs during migration of the code to a newer version.

SUMMARY

Shortcomings of the prior art are overcome and additional advantages are provided through the provision of a computer program product for facilitating processing within a computing environment. The computer program product includes a computer readable storage medium readable by a processing circuit and storing instructions for performing a method. The method includes determining a trace risk indicator based on statistical analysis of one or more risk factors associated with a portion of code of a computer program being executed. The one or more risk factors include data of at least one source external to the portion of code. Based on the trace risk indicator having a predetermined relationship with respect to a threshold value, tracing is automatically initiated for the portion of code.

Computer-implemented methods and systems relating to one or more aspects are also described and claimed herein. Further, services relating to one or more aspects are also described and may be claimed herein.

Additional features and advantages are realized through the techniques described herein. Other embodiments and aspects are described in detail herein and are considered a part of the claimed aspects.

BRIEF DESCRIPTION OF THE DRAWINGS

One or more aspects are particularly pointed out and distinctly claimed as examples in the claims at the conclusion of the specification. The foregoing and objects, features, and advantages of one or more aspects are apparent from the following detailed description taken in conjunction with the accompanying drawings in which:

FIGS. 3A-3B depict one example of facilitating processing within a computing environment, in accordance with an aspect of the present invention;

DETAILED DESCRIPTION

In accordance with an aspect of the present invention, a capability is provided to facilitate processing within a computing environment. The capability includes, for instance, automatically initiating tracing of computer programs (also referred to as applications) preemptively, prior to determining a defective condition in the program code, based on determining that there is a likelihood (e.g., above a certain threshold) of a defective condition occurring. This enables data to be obtained for even the first occurrence of the defective condition, and without having tracing on all the time.

In one aspect, tracing is automatically initiated based, for instance, on applying statistical analysis to runtime data, and not based on rigid rules or conditions for tracing. For instance, current and historical knowledge of selected risk factors, such as recent code changes, thrown exceptions for pertinent modules, number of defects previously corrected in a code portion, number of lines of code executed during testing and/or a performance cost of tracing, are used to determine whether a trace is to be automatically turned on. This facilitates tracing and improves performance of computer programs and/or of the processors executing the programs.

One embodiment of a computing environment to incorporate and use one or more aspects of the present invention is described with reference to FIG. 1. In one example, the computing environment is based on the z/Architecture hardware architecture offered by International Business Machines Corporation. One embodiment of the z/Architecture hardware architecture is described in a publication entitled, "z/Architecture Principles of Operation," IBM Publication No. SA22-7832-11, $12^{th}$ edition, September 2017, which is hereby incorporated herein by reference in its entirety. The z/Architecture hardware architecture, however, is only one example architecture; other architectures and/or other types of computing environments may include and/or use one or more aspects of the present invention.

Figure 1:
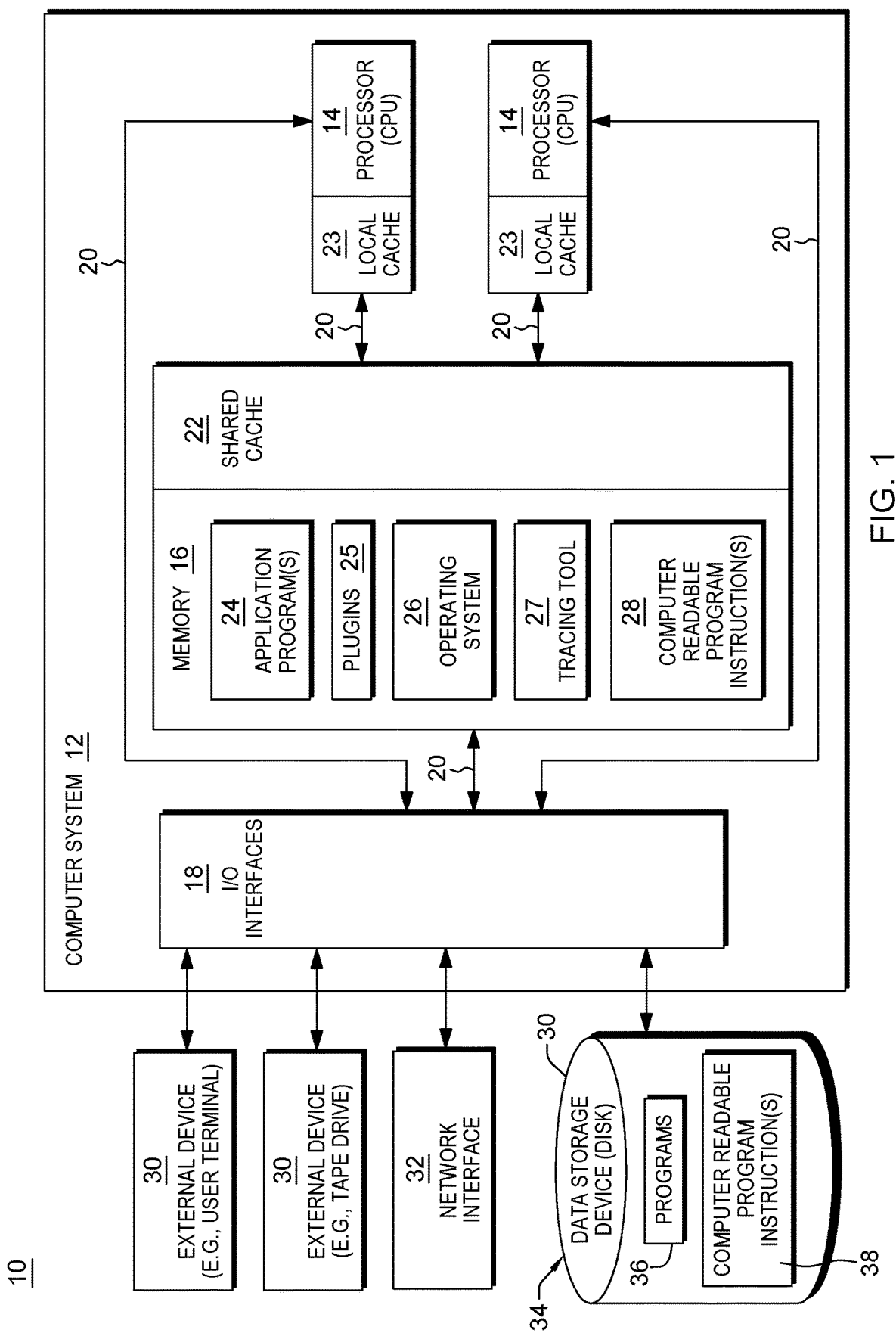
FIG. 1 depicts one example of a computing environment to incorporate and use one or more aspects of the present invention.

Referring to FIG. 1, a computing environment 10 includes, for instance, a computer system 12 shown, e.g., in the form of a general-purpose computing device. Computer system 12 may include, but is not limited to, one or more processors or processing units 14 (e.g., central processing units (CPUs)), a memory 16 (a.k.a., system memory, main memory, main storage, central storage or storage, as examples), and one or more input/output (I/O) interfaces 18, coupled to one another via one or more buses and/or other connections 20.

Bus 20 represents one or more of any of several types of bus structures, including a memory bus or memory controller, a peripheral bus, an accelerated graphics port, and a processor or local bus using any of a variety of bus architectures. By way of example, and not limitation, such architectures include the Industry Standard Architecture (ISA), the Micro Channel Architecture (MCA), the Enhanced ISA (EISA), the Video Electronics Standards Association (VESA) local bus, and the Peripheral Component Interconnect (PCI).

Memory 16 may include, for instance, a cache 22, such as a shared cache, which may be coupled to local caches 23 of processors 14. Further, memory 16 may include one or more computer programs or applications 24, one or more plugins 25 to add one or more functions to a computer program, an operating system 26, a tracing tool 27 used in tracing code of computer programs, and one or more computer readable program instructions 28. Computer readable program instructions 28 may be configured to carry out functions of embodiments of aspects of the invention.

Computer system 12 may also communicate via, e.g., I/O interfaces 18 with one or more external devices 30 and/or one or more network interfaces 32. Example external devices include a user terminal, data storage devices, such as a tape drive, disk or other data storage devices, a pointing device, a display, etc. In one particular example, a data storage device 34 may store one or more programs 36, one or more computer readable program instructions 38, and/or data, etc. The computer readable program instructions may be configured to carry out functions of embodiments of aspects of the invention.

Network interface 32 enables computer system 12 to communicate with one or more networks, such as a local area network (LAN), a general wide area network (WAN), and/or a public network (e.g., the Internet), providing communication with other computing devices or systems.

Computer system 12 may include and/or be coupled to removable/non-removable, volatile/non-volatile computer system storage media. For example, it may include and/or be coupled to a non-removable, non-volatile magnetic media (typically called a "hard drive"), a magnetic disk drive for reading from and writing to a removable, non-volatile magnetic disk (e.g., a "floppy disk"), and/or an optical disk drive for reading from or writing to a removable, non-volatile optical disk, such as a CD-ROM, DVD-ROM or other optical media. It should be understood that other hardware and/or software components could be used in conjunction with computer system 12. Examples, include, but are not limited to: microcode, device drivers, redundant processing units, external disk drive arrays, RAID systems, tape drives, and data archival storage systems, etc.

Computer system 12 may be operational with numerous other general purpose or special purpose computing system environments or configurations. Examples of well-known computing systems, environments, and/or configurations that may be suitable for use with computer system 12 include, but are not limited to, personal computer (PC) systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

In accordance with an aspect of the present invention, metadata relating to a computer program executing on a processor, such as processor 14, is used in statistical analysis of runtime data to determine whether tracing is to be automatically turned on for at least a portion of code of the computer program. The metadata includes, e.g., data from sources external to the program, such as a source control system and/or an error tracking system. Examples of data from a source control system that may be used in the determination include, for instance, an historical rate of change of the code, as well as the person who made recent code changes. An example of information from an error tracking system that may be relevant includes a history of defects associated with areas of the code (functional regressions). Further, performance information from an application profiling tool may help to determine an impact of enabling trace statements in certain areas of the code. Other possibilities exist.

The metadata is stored, for instance, in a plugin, such as plugin 25. This information, along with current runtime data, is used to determine whether there is a likelihood that a defective condition exists within the program being executed. If it is determined that tracing is to be turned on, tracing tool 27 is used to activate a trace within the computer program. One embodiment of processing associated with automatically turning on tracing is described with reference to FIG. 2. This processing is performed by, e.g., a processor, such as processor 14. In one example, the logic is included in a plugin, such as plugin 25.

Figure 2:
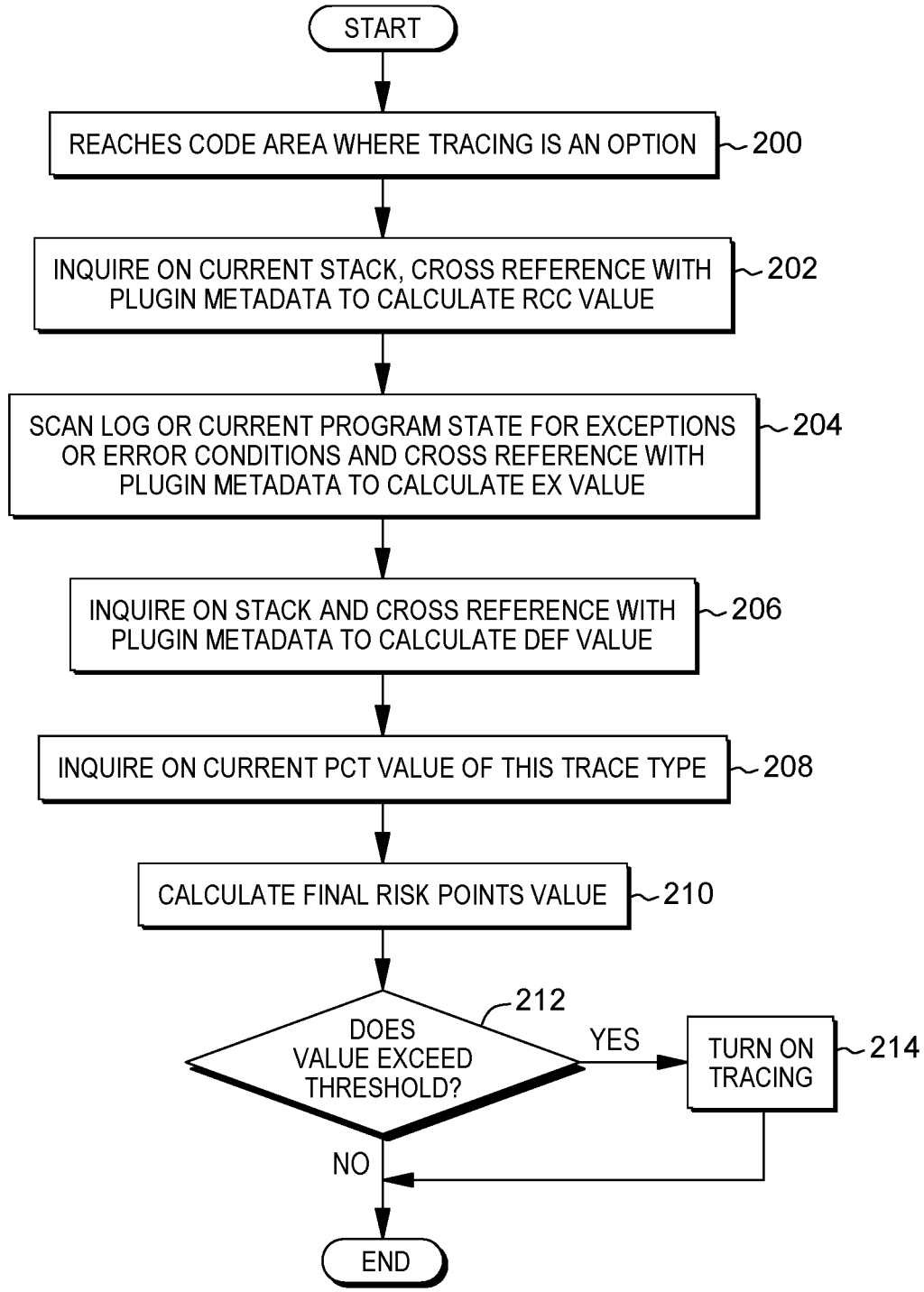
FIG. 2 depicts one example of processing to automatically initiate tracing of program code, in accordance with one or more aspects of the present invention.

Referring to FIG. 2, initially, a determination is made that execution in a computer program has reached an area (e.g., a portion of code) in which tracing is an option, STEP 200. Based on reaching such an area, metadata is used in structural analysis of runtime data to determine whether tracing is to be turned on, preemptively, prior to occurrence of a defective condition within the code. The metadata is stored, for instance, in a plugin (e.g., plugin 25) and includes historical data associated with a portion of code for which tracing may be performed.

In one example, a determination is made as to whether the portion of code has been recently changed (RCC—recently changed code), STEP 202. For instance, metadata stored, e.g., in a plugin, such as plugin 25, is used to determine if there have been code changes. As an example, the metadata is compared to the current stack to determine whether and to what extent the portion of code has changed.

Code that has recently changed is subject to a higher likelihood of regressive behavior. Thus, in one example, when the plugin (or program) queries as to whether tracing is to be turned on, it looks at the current stack (e.g., at least a portion of it) and checks to what degree the code has changed since the previous version, reflected in the metadata, as well as the date(s) of changes.

In one example, each line in the stack has, e.g., an indicator (e.g., a bit) that is turned on or off. If the code has changed less than a predetermined amount of time ago, the indicator is turned on. This means that a different call stack contributes to different amounts of risk points. A new entry point in the program is examined more closely than an old one.

To reduce complexity of analysis, the inquiry as to whether a line in the stack has changed is restricted to a function level. For example, if a code in a source file has changed, but the current function is untouched, then the risk points are reduced or removed.

The resulting effect of this is that newly changed code might add tracing in, for instance, the first 90 days of running, then would reduce the detail in tracing or remove it entirely, if no defects are encountered in the code in the 90 day period. Other examples are possible.

The stack line indicators are used to determine a number of risk points to be assigned to the risk factor of recently changed code. The number of risk points assigned to any risk factor is dependent, e.g., on design implementation. As examples, a scale of 1-10 or 1-100 may be used. In one implementation, the points assigned to the risk factors are relative to one another and are assigned based on impact to the execution of the code. For instance, the higher the impact, the greater the number of risk points assigned. Further, different trace options may be affected differently by the various risk factors and this is taken into consideration when assigning risk points. Other variations are also possible.

Further, in one embodiment, a log or current program state is scanned for exceptions or error conditions and cross-referenced with plugin metadata to calculate an exception (EX) value (e.g., risk points), STEP 204. An exception thrown from certain components in a program are more relevant than others. For example, a component that relies heavily on editors may be more prone to error, if there is, e.g., a Standard Widget Toolkit (SWT) exception, or even in the editor component itself. Metadata stored within the code component or plugin shows what type of exceptions and from which code areas the current component is more interested in.

As an example, a NullPointerException in an unrelated external plugin from a third party contributes little to no risk points, but an exception from a plugin on which a current component has a dependency contributes a high amount of risk points (i.e., relatively). Similar to the recently changed code, any stack trace from a thrown exception could be analyzed and each line of the stack could be used to calculate risk points.

Further, a number of previous defects corrected in the code portion is checked. For instance, an inquiry on the stack for defects is cross-referenced with plugin metadata to calculate a defect (DEF) value (e.g., risk points), STEP 206. As an example, by linking the code repository and its defective tracking system, different code areas could be assigned risk points if they have been the source of many defects previously (e.g., a select number or a number over a select threshold). When, in one example, a defect is corrected, a component or stack that provides information of where the problem in the code arose is specified. This means portions of code that have had many defects before are more likely to turn tracing on automatically.

Additionally, a performance cost of tracing (PCT) is determined, STEP 208. Different tracing options have different performance costs in terms of memory, CPU usage and time taken. There is, for instance, an inverse relationship between the performance cost and how many risk points it provides. For example, an extremely lightweight form of tracing that is imperceptible would have a large contribution to risk points. This value is, for instance, a modifier so its number would be used to multiply the total value of risk points. In one example, the PCT is a relative value of the impact of different tracing options, each providing a different amount of trace data. For instance, assume there are three trace techniques with the following relative value of impact to execution: 50% (slowdown), 30%, 10%, respectively. The option with a 50% slowdown is more robust, providing more trace data than either the option providing 30% slowdown or 10% slowdown. For this example, the PCT values are 0.5, 0.7 and 0.9, respectively. When the calculation is performed, the third trace option reduces the risk points by a lesser amount, and so is more likely to be chosen. The calculation is made for all three trace options. The one chosen, in one example, is the option with the greatest impact (slowdown) that still passes the risk points threshold. This enables the most trace data to be obtained. Other examples and variations are possible.

Additional, fewer and/or different risk factors may be used. For instance, another risk factor is how many lines of code have been executed during testing of at least the portion of code that may be traced. The fewer the count of lines exercised during testing, the higher the risk and thus, the higher the risk value. A yet further risk factor is the quality of code. A static analysis tool (e.g., LGTM, Coverity Scan, etc.) is used to perform an automated code review and produce a rating of a section of code. Other examples are also possible.

Based on the above, a final risk points value is determined, INQUIRY 210. For instance, risk points of one or more selected risk factors (e.g., RCC, EX, DEF, PCT) are combined together to provide a final risk points value. As another example, the value provided by the following risk points formula is used as the final risk points value:

(Recently Changed Code (RCC)+Exceptions (EX)+Number of Defects (DEF))×Performance Cost (PCT). Other examples are possible.

A determination is made as to whether this final risk points value exceeds a threshold (e.g., user or system defined threshold), INQUIRY 212. If the threshold is exceeded, tracing is automatically turned on, STEP 214. Otherwise, it remains off.

Described in detail above is a technique for automatically turning on tracing based on statistical analysis of current data using historical data. In one or more examples, one or more aspects are implemented as part of a framework, such as Eclipse, integrated into one or more plugins. Each source file, in one example, contributes metadata to the plugin of its change history, as well as the exceptions to which it is more susceptible. Information is provided that allows the tracing tool to have knowledge of how new or old the currently executed code is. The metadata could also contain the relative cost of each tracing technique (the cost is set, e.g., by the user, or automatically analyzed by comparing the time elapsed and/or CPU usage between units with tracing on and off). In a further embodiment, one or more aspects are coded directly into the tracing. Other embodiments are also possible.

One or more aspects of the present invention are inextricably tied to computer technology and facilitate processing within a computer, improving performance thereof. One or more aspects improve the technical field of tracing computer code to improve the code, and therefore, performance within the processor. Tracing provides information used in performance of one or more actions, including, but not limited to, revising code, changing a computer configuration, etc. The revised code is then re-executed to perform one or more tasks.

Further details of one embodiment of facilitating processing within a computing environment, as it relates to one or more aspects of the present invention, are described with reference to FIGS. 3A-3B.

Figure 3A:
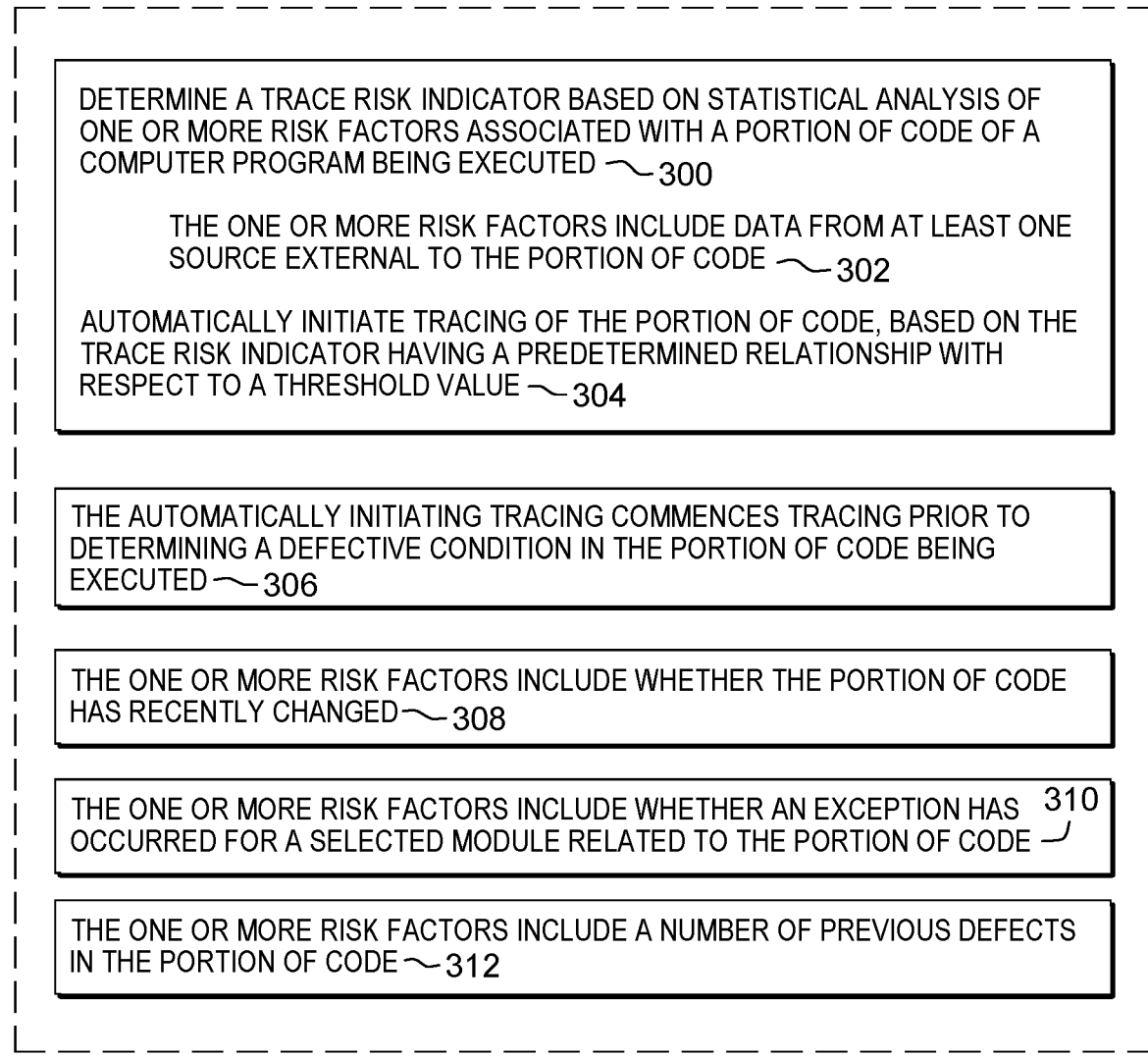

Referring to FIG. 3A, in one embodiment, a trace risk indicator is determined based on statistical analysis of one or more risk factors associated with a portion of code of a computer program being executed (300). The one or more risk factors include data from at least one source external to the portion of code (302). Based on the trace risk indicator having a predetermined relationship with respect to a threshold value, tracing of the portion of code is automatically initiated (304).

In one example, the automatically initiating tracing commences tracing prior to determining a defective condition in the portion of code being executed (306).

Further, as examples, the one or more risk factors include whether the portion of code has recently changed (308), whether an exception has occurred for a selected module related to the portion of code (310), and/or a number of previous defects in the portion of code (312).

Moreover, referring to FIG. 3B, the one or more risk factors include, for instance, a performance cost of tracing (314). As other examples, the one or more risk factors include a count of lines of at least the portion of code executed during testing (316), and/or the one or more risk factors include metadata historical data stored as metadata of a plugin of the computing environment (318). Other risk factors are possible.

In one example, the trace risk indicator includes a risk points value (320), and the determining the risk points value includes using an equation (322):

(Points assigned to recently changed code plus points assigned to code exceptions related to the portion of code plus points assigned to a number of defects in the portion of code) multiplied by a performance cost of tracing.

Further, in one example, the predetermined relationship includes exceeds (326), and the tracing is automatically initiated based on the risk points value exceeding the threshold value (328).

Other variations and embodiments are possible.

Figure 4A:
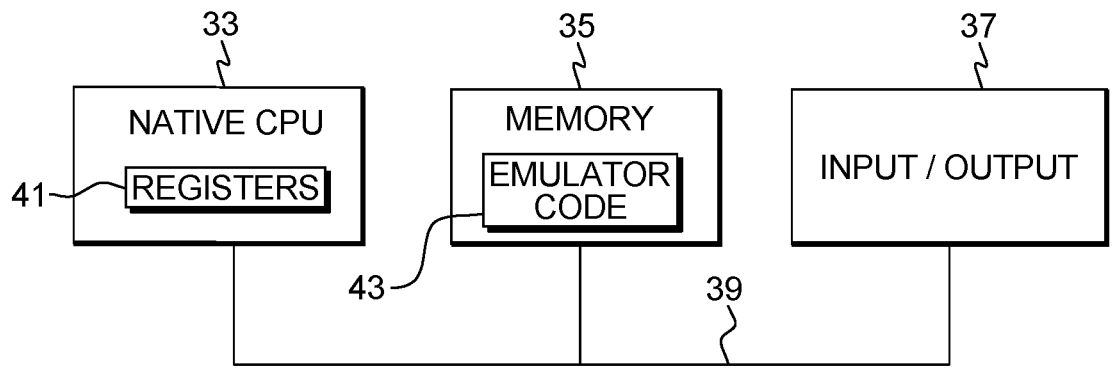
FIG. 4A depicts another example of a computing environment to incorporate and use one or more aspects of the present invention.

Aspects of the present invention may be used by many types of computing environments. Another embodiment of a computing environment to incorporate and use one or more aspects of the present invention is described with reference to FIG. 4A. In this example, a computing environment 31 includes, for instance, a native central processing unit (CPU) 33, a memory 35, and one or more input/output devices and/or interfaces 37 coupled to one another via, for example, one or more buses 39 and/or other connections. As examples, computing environment 31 may include a PowerPC® processor offered by International Business Machines Corporation, Armonk, N.Y.; an HP Superdome with Intel Itanium II processors offered by Hewlett Packard Co., Palo Alto, Calif.; and/or other machines based on architectures offered by International Business Machines Corporation, Hewlett Packard, Intel Corporation, Oracle, or others. IBM, z/Architecture and PowerPC are trademarks or registered trademarks of International Business Machines Corporation in at least one jurisdiction. Intel and Itanium are trademarks or registered trademarks of Intel Corporation or its subsidiaries in the United States and other countries.

Native central processing unit 33 includes one or more native registers 41, such as one or more general purpose registers and/or one or more special purpose registers used during processing within the environment. These registers include information that represents the state of the environment at any particular point in time.

Moreover, native central processing unit 33 executes instructions and code that are stored in memory 35. In one particular example, the central processing unit executes emulator code 43 stored in memory 35. This code enables the computing environment configured in one architecture to emulate another architecture. For instance, emulator code 43 allows machines based on architectures other than the z/Architecture hardware architecture, such as PowerPC processors, HP Superdome servers or others, to emulate the z/Architecture hardware architecture and to execute software and instructions developed based on the z/Architecture hardware architecture.

Figure 4B:
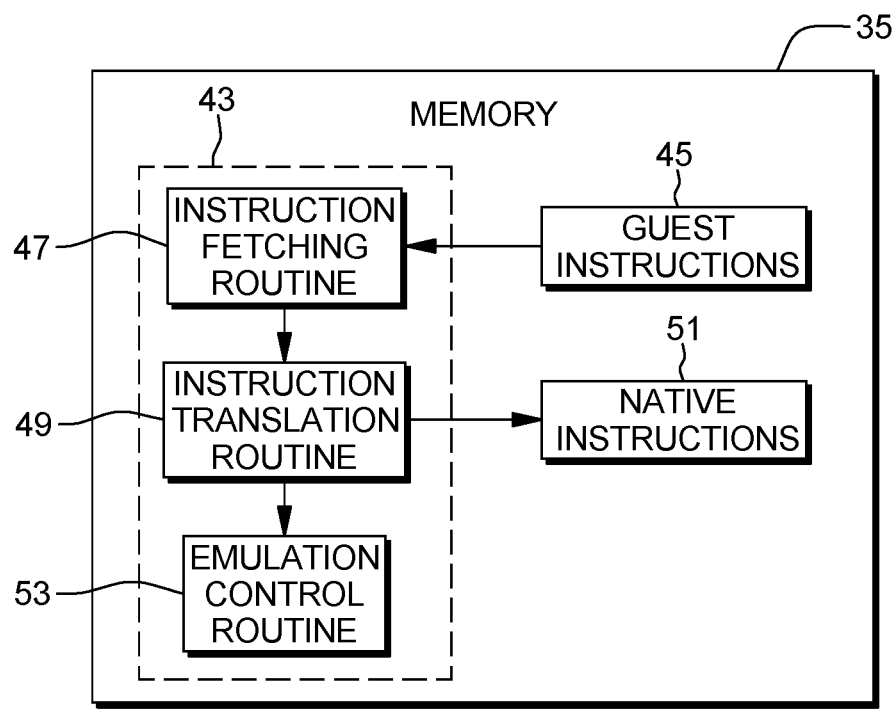
FIG. 4B depicts further details of the memory of FIG. 4A.

Further details relating to emulator code 43 are described with reference to FIG. 4B. Guest instructions 45 stored in memory 35 comprise software instructions (e.g., correlating to machine instructions) that were developed to be executed in an architecture other than that of native CPU 33. For example, guest instructions 45 may have been designed to execute on a processor based on the z/Architecture hardware architecture, but instead, are being emulated on native CPU 33, which may be, for example, an Intel Itanium II processor. In one example, emulator code 43 includes an instruction fetching routine 47 to obtain one or more guest instructions 45 from memory 35, and to optionally provide local buffering for the instructions obtained. It also includes an instruction translation routine 49 to determine the type of guest instruction that has been obtained and to translate the guest instruction into one or more corresponding native instructions 51. This translation includes, for instance, identifying the function to be performed by the guest instruction and choosing the native instruction(s) to perform that function.

Further, emulator code 43 includes an emulation control routine 53 to cause the native instructions to be executed. Emulation control routine 53 may cause native CPU 33 to execute a routine of native instructions that emulate one or more previously obtained guest instructions and, at the conclusion of such execution, return control to the instruction fetch routine to emulate the obtaining of the next guest instruction or a group of guest instructions. Execution of the native instructions 51 may include loading data into a register from memory 35; storing data back to memory from a register; or performing some type of arithmetic or logic operation, as determined by the translation routine.

Each routine is, for instance, implemented in software, which is stored in memory and executed by native central processing unit 33. In other examples, one or more of the routines or operations are implemented in firmware, hardware, software or some combination thereof. The registers of the emulated processor may be emulated using registers 41 of the native CPU or by using locations in memory 35. In embodiments, guest instructions 45, native instructions 51 and emulator code 43 may reside in the same memory or may be disbursed among different memory devices.

The computing environments described above are only examples of computing environments that can be used. Other environments, including but not limited to, non-partitioned environments, partitioned environments, and/or emulated environments, may be used; embodiments are not limited to any one environment.

Each computing environment is capable of being configured to include one or more aspects of the present invention. For instance, each may be configured to provide automatically initiating of tracing, in accordance with one or more aspects of the present invention.

One or more aspects may relate to cloud computing.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 5:
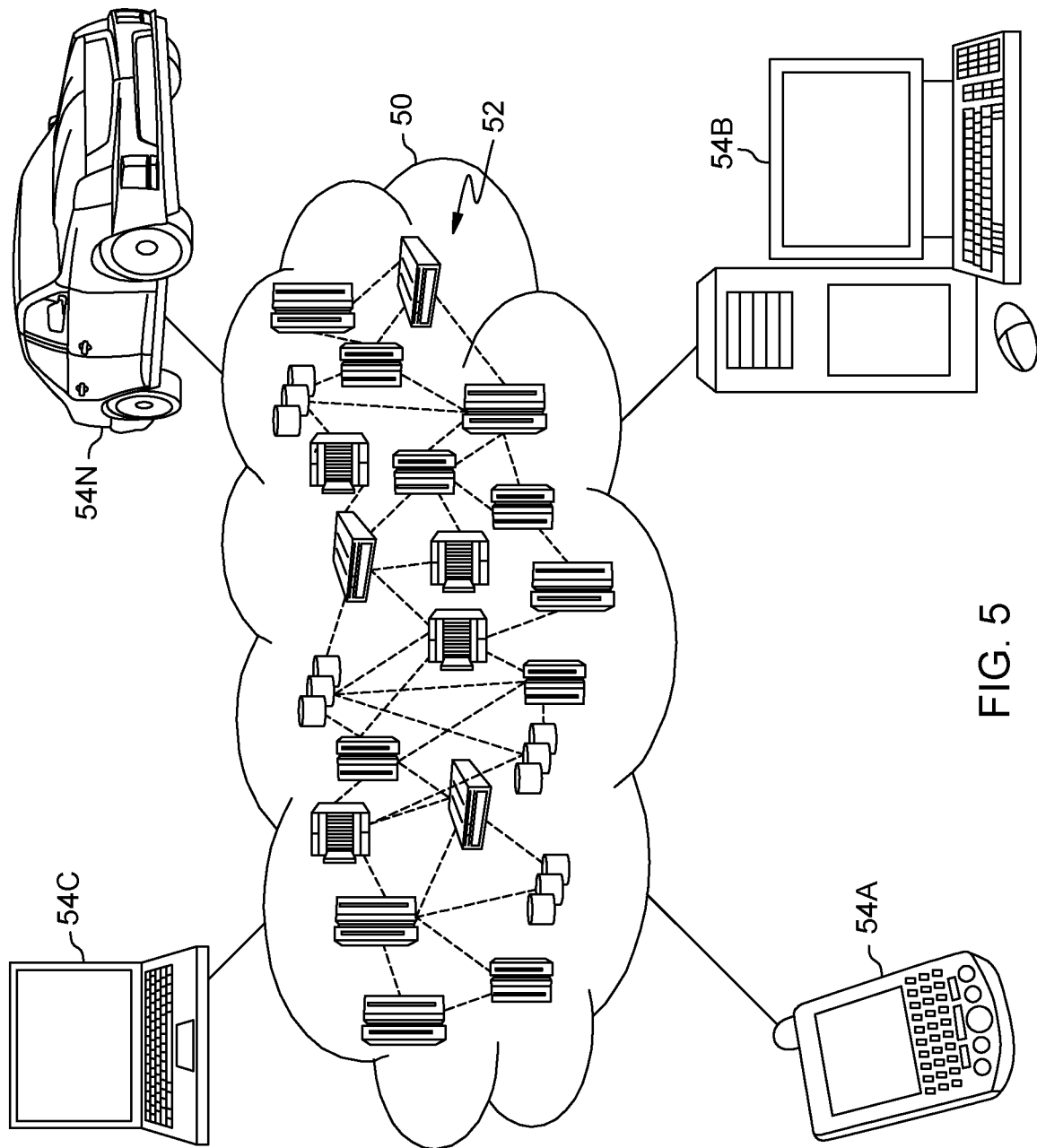
FIG. 5 depicts one embodiment of a cloud computing environment.

Referring now to FIG. 5, illustrative cloud computing environment 50 is depicted. As shown, cloud computing environment 50 includes one or more cloud computing nodes 52 with which local computing devices used by cloud consumers, such as, for example, personal digital assistant (PDA) or cellular telephone 54A, desktop computer 54B, laptop computer 54C, and/or automobile computer system 54N may communicate. Nodes 52 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 52 and cloud computing environment 50 can communicate with any type of computerized device over any type of network and/or network addressable connection (e.g., using a web browser).

Figure 6:
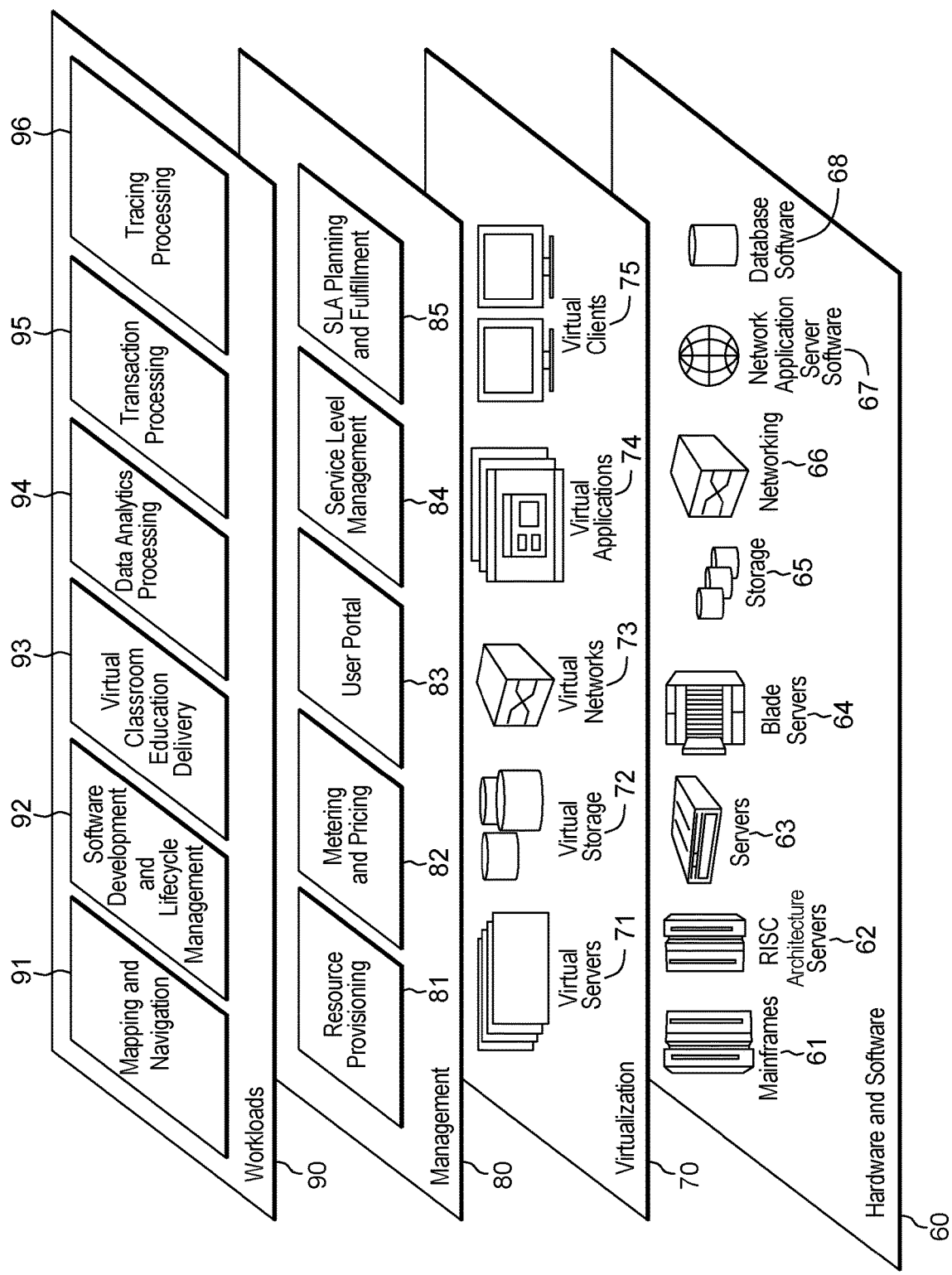
FIG. 6 depicts one example of abstraction model layers.

Referring now to FIG. 6, a set of functional abstraction layers provided by cloud computing environment 50 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and tracing processing 96.

Aspects of the present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In addition to the above, one or more aspects may be provided, offered, deployed, managed, serviced, etc. by a service provider who offers management of customer environments. For instance, the service provider can create, maintain, support, etc. computer code and/or a computer infrastructure that performs one or more aspects for one or more customers. In return, the service provider may receive payment from the customer under a subscription and/or fee agreement, as examples. Additionally, or alternatively, the service provider may receive payment from the sale of advertising content to one or more third parties.

In one aspect, an application may be deployed for performing one or more embodiments. As one example, the deploying of an application comprises providing computer infrastructure operable to perform one or more embodiments.

As a further aspect, a computing infrastructure may be deployed comprising integrating computer readable code into a computing system, in which the code in combination with the computing system is capable of performing one or more embodiments.

As yet a further aspect, a process for integrating computing infrastructure comprising integrating computer readable code into a computer system may be provided. The computer system comprises a computer readable medium, in which the computer medium comprises one or more embodiments. The code in combination with the computer system is capable of performing one or more embodiments.

Although various embodiments are described above, these are only examples. For example, computing environments of other architectures can be used to incorporate and use one or more embodiments. Further, other risk factors and/or tracing techniques may be used. Many variations are possible.

Further, other types of computing environments can benefit and be used. As an example, a data processing system suitable for storing and/or executing program code is usable that includes at least two processors coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description, but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:

1. A computer program product for facilitating processing within a computing environment, the computer program product comprising:
   at least one computer readable storage medium readable by at least one processing circuit and storing instructions for performing a method comprising:
      determining that a computer program being executed has reached a portion of code in which tracing is an option for the portion of code;
      determining, based on reaching the portion of code, whether tracing is to be preemptively turned on for the portion of code prior to occurrence of a defective condition within the computer program being executed, the determining whether tracing is to be preemptively turned on including using metadata associated with the computer program in structural analysis of runtime data of the computer program to determine whether tracing is to be preemptively turned on, wherein the using metadata in structural analysis of runtime data includes:
         determining a trace risk indicator using the metadata and based on statistical analysis of one or more risk factors associated with the portion of code of the computer program being executed, the one or more risk factors including data from at least one source external to the portion of code and including a count of lines of at least the portion of code executed during testing, the trace risk indicator comprising a risk points value, and wherein determining the risk points value comprises using an equation, the equation comprising; (points assigned to recently changed code plus points assigned to exceptions related to the portion of code plus points assigned to a number of defects in the portion of code) multiplied by a performance cost of tracing; and
      automatically initating tracing of the portion of code of the computer program, based on the trace risk indicator having a predetermined relationship with respect to a threshold value.

2. The computer program product of claim 1, wherein the one or more risk factors include whether the portion of code has recently changed.

3. The computer program product of claim 1, wherein the one or more risk factors include whether an exception has occurred for a selected module related to the portion of code.

4. The computer program product of claim 1, wherein the one or more risk factors include a number of previous defects in the portion of code.

5. The computer program product of claim 1, wherein the one or more risk factors include the performance cost of tracing.

6. The computer program product of claim 1, wherein the performance cost of tracing is in terms of memory, processor usage and time taken.

7. The computer program product of claim 1, wherein the metadata includes historical data and is stored in a plugin of the computing environment.

8. The computer program product of claim 1, wherein the points assigned to the recently changed code, the exceptions and the number of defects are relative to one another and are assigned based on impact to execution of the computer program.

9. The computer program product of claim 1, wherein the predetermined relationship comprises exceeds, and wherein the tracing is automatically initiated based on the risk points value exceeding the threshold value.

10. A computer system for facilitating processing within a computing environment, the computer system comprising:
a memory; and
a processor coupled to the memory, wherein the computer system is configured to perform a method comprising:
determining that a computer program being executed has reached a portion of code in which tracing is an option for the portion of code;
determining, based on reaching the portion of code, whether tracing is to be preemptively turned on for the portion of code prior to occurrence of a defective condition within the computer program being executed, the determining whether tracing is to be preemptively turned on including using metadata associated with the computer program in structural analysis of runtime data of the computer program to determine whether tracing is to be preemptively turned on, wherein the using metadata in structural analysis of runtime data includes:
determining a trace risk indicator using the metadata and based on statistical analysis of one or more risk factors associated with the portion of code and including a count of lines of at least the portion of code executed during testing, the trace risk indicator comprising a risk points value, and wherein determining the risk points value comprises using an equation, the equation comprising: (points assigned to recently changed code plus points assigned to exceptions related to the portion of code plus points assigned to a number of defects in the portion of code) multiplied by a performance cost of tracing; and
automatically initiating tracing of the portion of code of the computer program, based on the trace risk indicator having a predetermined relationship with respect to a threshold value.

11. The computer system of claim 10, wherein the performance cost of tracing is in terms of memory, processor usage and time taken.

12. The computer system of claim 10, wherein the one or more risk factors are selected from a group of risk factors consisting of: whether the portion of code has recently changed, whether an exception has occurred for a selected module related to the portion of code, a number of previous defects in the portion of code, and the performance cost of tracing.

13. The computer system of claim 10, wherein the metadata includes historical data and is stored in a plugin of the computing environment.

14. The computer system of claim 10, wherein the points assigned to the recently changed code, the exceptions and the number of defects are relative to one another and are assigned based on impact to execution of the computer program.

15. A computer-implemented method of facilitating processing within a computing environment, the computer-implemented method comprising:
determining that a computer program being executed has reached a portion of code in which tracing is an option for the portion of code;
determining, based on reaching the portion of code, whether tracing is to be preemptively turned on for the portion of code prior to occurrence of a defective condition within the computer program being executed, the determining whether tracing is to be preemptively turned on including using metadata associated with the computer program in structural analysis of runtime data of the computer program to determine whether tracing is to be preemptively turned on, wherein the using metadata in structural analysis of runtime data includes:
determining, by a processor, a trace risk indicator using the metadata and based on statistical analysis of one or more risk factors associated with the portion of code of the computer program being executed, the one or more risk factors including data of at least one source external to the portion of code and including a count of lines of at least the portion of code executed during testing, the trace risk indicator comprising a risk points value, and wherein determining the risk points value comprises using an equation, the equation comprising; (points assigned to recently changed code plus points assigned to exceptions related to the portion of code plus points assigned to a number of defects in the portion of code) multiplied by a performance cost of tracing; and
automatically initiating tracing of the portion of code of the computer program, based on the trace risk indicator having a predetermined relationship with respect to a threshold value.

16. The computer-implemented method of claim 15, wherein the performance cost of tracing is in terms of memory, processor usage and time taken.

17. The computer-implemented method of claim 15, wherein the one or more risk factors are selected from a group of risk factors consisting of:
whether the portion of code has recently changed, whether an exception has occurred for a selected module related to the portion of code, a number of previous defects in the portion of code, and the performance cost of tracing.

18. The computer-implemented method of claim 15, wherein the metadata includes historical data and is stored in a plugin of the computing environment.

19. The computer-implemented method of claim 15, wherein the points assigned to the recently changed code, the exceptions and the number of defects are relative to one another and are assigned based on impact to execution of the computer program.

20. The computer system of claim 10, wherein the predetermined relationship comprises exceeds, and wherein the tracing is automatically initiated based on the risk points value exceeding the threshold value.

* * * * *